US008768493B2

(12) United States Patent
Souvay et al.

(10) Patent No.: US 8,768,493 B2
(45) Date of Patent: Jul. 1, 2014

(54) POWER LINE LIGHT CONTROLLER SYSTEM AND METHOD

(75) Inventors: Francois-Xavier Souvay, Boucherville (CA); Gregory Campbell, Walpole, MA (US)

(73) Assignee: Lumenpulse Lighting Inc. (CA)

( * ) Notice: Subject to any disclaimer, the term of this patent is extended or adjusted under 35 U.S.C. 154(b) by 0 days.

(21) Appl. No.: 13/455,544

(22) Filed: Apr. 25, 2012

(65) Prior Publication Data

US 2013/0289750 A1 Oct. 31, 2013

(51) Int. Cl.
*G05B 15/00* (2006.01)

(52) U.S. Cl.
USPC .......... 700/83

(58) Field of Classification Search
USPC .......... 700/83
See application file for complete search history.

(56) References Cited

U.S. PATENT DOCUMENTS

| | | | | |
|---|---|---|---|---|
| 4,889,999 | A * | 12/1989 | Rowen | 307/31 |
| 6,930,455 | B2 | 8/2005 | Chansky et al. | |
| 7,676,300 | B2 | 3/2010 | Kim et al. | |
| 7,984,135 | B2 | 7/2011 | Kaneko et al. | |
| 2002/0026532 | A1 | 2/2002 | Maeda et al. | |
| 2002/0181497 | A1 | 12/2002 | Mano et al. | |
| 2003/0197426 | A1* | 10/2003 | Carson et al. | 307/40 |
| 2004/0225811 | A1 | 11/2004 | Fosler | |
| 2005/0225976 | A1* | 10/2005 | Zampini et al. | 362/227 |
| 2005/0289279 | A1* | 12/2005 | Fails et al. | 710/315 |
| 2008/0180040 | A1* | 7/2008 | Prendergast et al. | 315/297 |
| 2009/0066266 | A1 | 3/2009 | Jungwirth et al. | |
| 2009/0112581 | A1* | 4/2009 | Lin | 704/219 |
| 2010/0060194 | A1 | 3/2010 | Furry et al. | |
| 2010/0111538 | A1* | 5/2010 | Arita et al. | 398/130 |
| 2012/0133298 | A1* | 5/2012 | Campbell | 315/250 |
| 2012/0133303 | A1* | 5/2012 | Campbell et al. | 315/312 |

FOREIGN PATENT DOCUMENTS

WO 2007121573 A1 11/2007

* cited by examiner

*Primary Examiner* — Mohammad Ali
*Assistant Examiner* — Sivalingam Sivanesan
(74) *Attorney, Agent, or Firm* — Burns & Levinson LLP; Joseph M. Maraia

(57) ABSTRACT

In some examples, light controller technology includes methods and apparatuses. In other examples, the technology includes a light controller system. The system includes one or more light fixtures. Each light fixture of the one or more light fixture is electrically coupled via a power line. Each light fixture of the one or more light fixtures includes a protocol conversion module configured to convert instructions between power line communication and first remote device management communication, a communication module configured to communicate the power line communication over the power line, and a light controller configured to control one or more light emitting diodes (LEDS) in the respective light fixture based on the instructions.

19 Claims, 7 Drawing Sheets

POWER LINE LIGHT CONTROLLER SYSTEM AND METHOD

BACKGROUND

Light fixtures are, generally, hard-wired directly to light controllers. However, due to the limited ability to retrofit wires in a building, the hard-wired connections are challenging, if not impossible, to re-configure without extensive costs. In some installations, the light fixtures are connected to light controllers via a power line. However, due to the number of light fixtures in a typical building and the limited data bandwidth of a power line, the power line connections between individual light fixtures is limited in its control capacity, thereby limiting control inputs to light fixtures. Thus, a need exists in the art for improved power line light controller processes and apparatuses for a light system with the features as described herein.

SUMMARY

As a general overview of power line light controller processes and apparatuses for a light system (hereinafter referred to as "technology"), the technology includes a master controller that communicates with one or more individually controllable lights via power line communication over a power line utilizing remote device management (RDM) communication. The master controller can convert RDM communication to power line communication for transmission over a power line to the lights and/or the lights can convert the power line communication to RDM communication for control of the individual lights. For example, a master controller (e.g., mobile phone, personal computing device, etc.) transmits a power line communication including an instruction to change a color temperature for lights A-G. The power line communication can include the individual addresses for lights A-G to direct the power line communication to the correct lights. The lights A-G receive the power line communication and respond to the instruction to change the color temperature of the light A-G. In this regard, the master controller can advantageously enable the conversion of RDM communication (in this example, an inherently robust protocol with a high bandwidth capacity with quality control features) to power line communication (in this example, an inherently slow protocol with a low bandwidth capacity with limited quality control features), thereby increasing the available uses for light fixtures and decreasing the installation time for light systems.

One approach to a power line light controller is a system that controls light fixtures. The system includes one or more light fixtures and each light fixture of the one or more light fixture is electrically coupled via a power line. Each light fixture of the one or more light fixtures includes a protocol conversion module configured to convert instructions between power line communication and first remote device management communication, a communication module configured to communicate the power line communication over the power line, and a light controller configured to control one or more light emitting diodes (LEDS) in the respective light fixture based on the instructions. The system further includes a master controller. The master controller includes a protocol conversion module configured to convert the instructions between the power line communication and the remote device management communication and a communication module configured to communicate the power line communication over the power line.

Another approach to a power line light controller is a method that controls light fixtures. The method includes receiving a remote device management (RDM) communication, the RDM communication comprises one or more instructions associated with one or more light fixtures; converting the remote device management communication to a power line communication; and transmitting the power line communication to the one or more light fixtures via the power line.

Another approach to a power line light controller is a protocol conversion device that can control light fixtures. The protocol conversion device includes a communication module configured to receive a remote device management (RDM) communication, the RDM communication includes one or more instructions to control one or more light fixtures, status monitoring information, energy management information, or any combination thereof; a protocol conversion module configured to convert the remote device management communication to a power line communication; and a power line transmitter configured to transmit the power line communication via the power line.

Any of the approaches described herein can include one or more of the following examples.

In some examples, each light fixture of the one or more light fixtures further includes a light response module configured to generate the instructions based on the control of the one or more LEDS, the instructions comprise a light temperature, a light setting, or any combination thereof.

In other examples, the protocol conversion module of the master controller is further configured to identify the instructions in the remote device communication; and encapsulate the identified instructions in the power line communication.

In some examples, the protocol conversion module for each light fixture of the one or more light fixtures is further configured to identify the instructions in the power line communication; identify a remote device management code for a valid remote device management communication; and generate the remote device management communication based on the identified instructions and the identified remote device management code.

In other examples, the RDM communication is received from a controller operated by a user and the one or more instructions control the one or more light fixtures.

In some examples, the RDM communication is received from the one or more light fixtures and the one or more instructions comprise light information for the one or more light fixtures.

In other examples, the method further includes identifying the one or more instructions to control the one or more light fixtures in the RDM communication; and encapsulating the one or more instructions in the power line communication, the one or more instructions are a smaller byte size than the RDM communication.

In some examples, the method further includes identifying one or more RDM codes in the RDM communication based on a RDM code index; and replacing the identified one or more RDM codes with a RDM code index identifier in the RDM communication.

In other examples, the RDM code index includes a plurality of RDM codes with corresponding RDM code index identifiers and the RDM code index identifier is a smaller byte size than the corresponding RDM code.

In some examples, the RDM code index includes a plurality of pre-determined RDM codes and each of the plurality of pre-determined RDM codes has a corresponding RDM code index identifier.

In other examples, the method further includes identifying at least one redundant RDM code in the RDM communication; generating a RDM code index identifier for the identified at least one redundant RDM code in the RDM communication; and adding the RDM code index identifier and the identified at least one redundant RDM code to the RDM code index.

In some examples, the method further includes identifying one or more unutilized RDM codes in the RDM communication based on a RDM type of the RDM communication; and removing the identified one or more unutilized RDM codes from the RDM communication.

In other examples, the method further includes identifying a RDM packet structure in the RDM communication; and removing one or more headers in the RDM packet structure from the RDM communication.

In some examples, the RDM communication includes a plurality of RDM messages and the method further includes identifying one or more light fixture recipients of the plurality of RDM messages; grouping the plurality of RDM messages into one or more sub-sets of RDM messages based on the identification of the one or more light fixture recipients of the plurality of RDM messages; and generating the power line communication based on the one or more sub-sets of RDM messages.

In other examples, the RDM communication includes a plurality of RDM messages, each light fixture of the one or more light fixtures comprises one or more light emitting diodes (LEDS), and the method further includes identifying one or more LEDS recipients of the plurality of RDM messages; grouping the plurality of RDM messages into one or more sub-sets of RDM messages based on the identification of the one or more LEDS recipients of the plurality of RDM messages; and generating the power line communication based on the one or more sub-sets of RDM messages.

In some examples, each of the one or more light fixtures includes a plurality of light emitting diodes (LEDs).

In other examples, the protocol conversion module is further configured to remove one or more unutilized RDM codes from the remote device management communication before conversion to the power line communication.

In some examples, the protocol conversion module is further configured to identify redundant RDM codes in the remote device management communication; consolidate the identified redundant RDM codes into a single RDM code; and replace the identified redundant RDM codes with the single RDM code in the remote device management communication before conversion to the power line communication.

In other examples, the protocol conversion module is further configured to identify the one or more instructions to control the one or more light fixtures, the status monitoring information, the energy management information, or any combination thereof in the RDM communication; identify one or more recipients of the RDM communication; and generate the power line communication based on the identified one or more recipients and the identified one or more instructions to control the one or more light fixtures, the identified status monitoring information, the identified energy management information, or any combination thereof.

The power line light controller systems and methods described herein (hereinafter "technology") can provide one or more of the following advantages. An advantage of the technology is that the use of a protocol conversion device (e.g., embedded into a master controller, embedded into a light fixture, etc.) with the power line communication in an existing electrical infrastructure decreases the installation cost of technology, thereby increasing the effective uses of the technology. Another advantage of the technology is that the use of the master controller with the power line communication increases the user's flexibility for configuring lights while reducing the installation cost (e.g., reduced cable cost, reduced labor cost, etc.), thereby increasing the effective uses of the technology (e.g., use in retrofits of existing buildings, use in remodels of existing buildings, use in new construction, etc.).

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

As a general overview of power line light controller processes and apparatuses for a light emitting diode (LED) light system (hereinafter referred to as "technology"), the technology includes a master controller that communicates with one or more individually controllable LEDS lights via power line communication over a power line and converts remote device management (RDM) communication to/from the power line communication. For example, a master controller (e.g., mobile phone, personal computing device, etc.) transmits a power line communication including an instruction to change a color temperature for LED lights A-G to a light fixture. In this example, the light fixture converts the power line communication to a RDM communication and utilizes the RDM communication to control one or more LED lights (e.g., turn on LED lights, change the intensity of LED lights, etc.).

As another example, the master controller receives a RDM communication and converts the RDM communication to a power line communication with the instruction to change the color temperature for LED lights A-G. The power line communication can include the individual addresses for LED lights A-G to direct the power line communication to the correct lights to change the color temperature (e.g., change the color temperature of the lights to 2700 Kelvin, change the color temperature to 4500 Kelvin, change the color temperature to 6000 Kelvin, etc.). The LED lights A-G receive the power line communication and respond to the instruction to change the color temperature. In this regard, the master controller can advantageously enable the conversion of RDM communication (in this example, an inherently robust protocol with a high bandwidth capacity with particular quality control features and high communication overhead) to power line communication (in this example, an inherently slow protocol with a low bandwidth capacity with other types of quality control features and low communication overhead), thereby increasing the available uses for light fixtures and decreasing the installation time for light systems.

Another advantage of the technology is that the transition between RDM communication and power line communication is transparent to the end user controlling the light systems, thereby decreasing configuration time and increasing customer satisfaction with the configuration of the light system. Another advantage of the technology is that the conversion between RDM communication and power line communication advantageously bridges communication between two different types of communication techniques, thereby increasing the usability of the portable configuration functionality of the technology.

Figure 1:
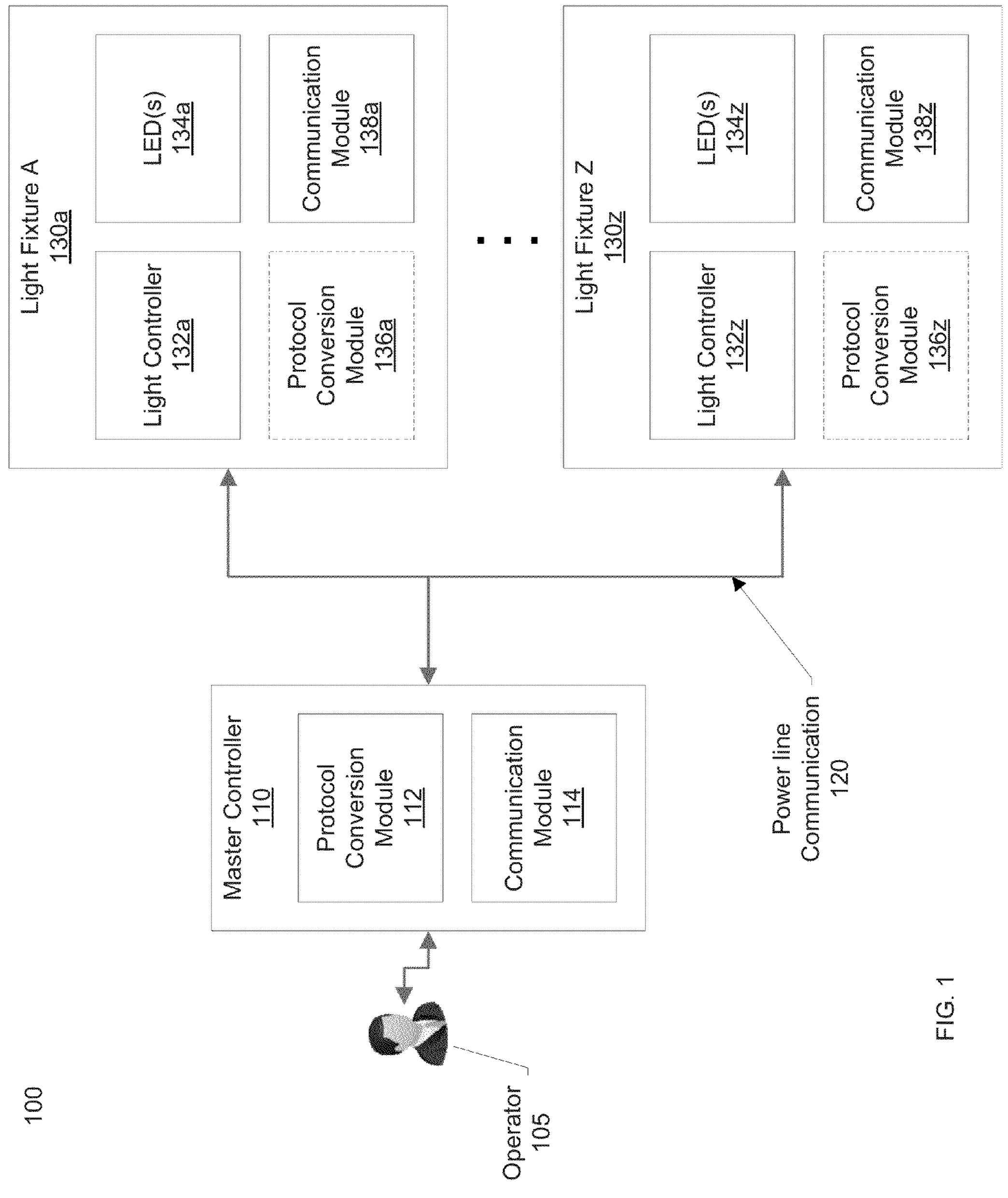
FIG. 1 is a block diagram of an exemplary lighting environment.

FIG. 1 is a block diagram of an exemplary lighting environment 100. The environment 100 includes a master controller 110 and a plurality of light fixtures A 130*a* through Z 130*z*. The master controller 110 is operated by an operator 105 (e.g., input light controls, adjust light controls, input light addresses, etc.). The master controller 110 includes a protocol conversion module 112 and a communication module 114. Each of the light fixtures A 130*a* through Z 130*z* includes a light controller 132*a* through 132*z*, light emitting diodes (LEDS) 134*a* through 134*z*, an optional protocol conversion module 136*a* through 137*z*, and a communication module 138*a* through 138*z*. The master controller 110 communicates the plurality of light fixtures A 130*a* through Z 130*z* via power line communication (PLC). The PLC is in a PLC protocol. The operator 105 can adjust the master controller 110 (e.g., adjust a knob, slide a control, etc.)

The master controller 110 can receive a remote device management (RDM) communication from an input device (not shown) (e.g., a computing device with light fixture controller, a computing device with an automated light control program, a slider, a knob, etc.). The protocol conversion module 112 converts the RDM communication to a power line communication 120. The communication module 114 communicates the power line communication 120 to one or more of the light fixtures A 130*a* through Z 130*z*.

The communication module 138*a* through 138*z* of the respective light fixture A 130*a* through Z 130*z* receives the power line communication 120. The respective protocol conversion module 136*a* through 136*z* converts the power line communication 120 to a RDM communication. The respective light controller 132*a* through 132*z* controls the respective LEDs 134*a* through 134*z* based on the RDM communication (e.g., change the intensity of a LED, turn on a set of LEDs, etc.). The conversion of the RDM communication to power line communication advantageously decreases the installation cost of the light control system by decreasing the cost to install and maintain wires (besides the wires providing power) between the controlling device (in this example, the master controller) and the light fixtures.

In operation, the master controller 110 converts (e.g., embed the instructions in power line communication, extract the instructions from the RDM communication and generates a power line communication, etc.) the RDM communication to power line communication 120. The conversion of the RDM communication into power line communication and vice versa (power line communication into RDM communication) advantageously enables the integration of control of lights into existing power line control infrastructure, thereby reducing the maintenance and control costs for a light system. The conversion of the RDM communication into power line communication and vice versa advantageously increases the flexibility of the light system by enabling control of the lights using existing power line control infrastructure. The master controller 110, via the communication module 114, communicate the power line communication 120 (e.g., amplitude modulation, digital power line carrier, pulse-position modulation, etc.) to the light fixtures A 130*a* through Z 130*z*.

In other examples, the conversion between RDM communication and power line communication can include identification of the instructions within the RDM communication, identification of the addresses for the lights being controlled by the instructions within the RDM communication, and generation of the power line communication based on the instructions, addresses, and/or protocol information associated with the power line communication (e.g., amplitude format, quality control requirements, etc.). In some examples, the conversation between RDM communication and power line communication further includes receiving a plurality of RDM packets and determining when the instructions for particular lights are complete (e.g., all of the RDM packets that include instructions have been received, enough of the RDM packets have been received to generate the power line communication, etc.).

In some examples, the light fixtures A 130*a* through Z 130*z* communicate power line communication 120 to the master controller 110. The master controller 110 can convert the power line communication 120 to RDM communication. The master controller 110 can display and/or provide feedback of the power line communication to the operator 105.

In other examples, the conversion between power line communication and RDM communication can include identification of the instructions within the power line communication, identification of the addresses for the lights being controlled by the instructions within the power line communication, and generation of the RDM communication based on the instructions, addresses, and/or protocol information associated with the RDM communication (e.g., packet format, quality control requirements, etc.). In other examples, the conversation between power line communication and RDM communication further includes receiving a plurality of power line packets and determining when the instructions for particular lights are complete (e.g., all of the power line packets that include instructions have been received, enough of the power line packets have been received to generate the RDM communication, etc.).

In other examples, the light fixtures A 130*a* through Z 130*z* and/or individual LEDs 134*a* through 134*z* are individually addressable for control of the lights. The individual control of one or more of the lights advantageously enables the operator 105 and/or the master controller 110 to control a subset of the lights. In some examples, the master controller 110 transmits the power line communication 120 to a light fixture in the one or more light fixtures A 130*a* through Z 130*z* based on a light address associated with the light fixture. In other words, the individualized addressing of the light fixtures enables the master controller 110 to focus control activities on the lights that are being controlled by the instructions.

In some examples, the instructions to control the one or more lights include one or more addresses for individual lights in the one or more light fixtures. The master controller 110 can include the addresses for the individual lights in the power line communication 120. In other words, the power line communication 120 can include individual addresses for a subset of the lights (in this example, individual LEDs) for individualized control of the particular lights (e.g., reduce the intensity of half of the lights, change the color temperature for every third light in a light array, etc.).

In other examples, the instructions to control the one or more lights include a color temperature instruction for at least one of the one or more lights. In some examples, the color temperature instruction includes individual intensity instructions for one or more color temperature light emitting diodes (LEDs) in the one or more lights.

In other examples, the RDM communication can be embedded into any type of network protocol (e.g., wifi, transmission control protocol (TCP)/internet protocol (IP), etc.). In this example, the wireless light controller converts the TCP/IP RDM communication into a carrier wave modulation power line communication. Table 1 illustrates exemplary conversions between RDM communication and power line communication.

TABLE 1

| Exemplary Conversion | | | |
|---|---|---|---|
| RDM Communication Instruction | RDM Communication Type | Power Line Communication Instruction | Power Line Communication Type |
| Turn Lights to 50% Intensity | Single RDM packet | Turn Lights to 50% Intensity | Pulse-Position Modulation |
| Change the Color Temperature of the Lights | Three RDM packets | Change the Color Temperature of the Lights | Distribution Line Carrier |
| Change the Position of the Lights | Ten RDM packets | Change the Position of the Lights | Amplitude Modulation |
| Turn Every other Light Off | Single RDM packet | Turn Every other Light Off | Pulse Modulation |

In some examples, each light fixture A 130*a* through Z 130*z* includes a light response module (not shown). Each light response module generates the instructions based on the control of the one or more LEDs. The instructions include a light temperature and/or a light setting. In other words, the light respond module detects a change in the one or more LEDs and generates the instructions with information about the detected change.

In other examples, the protocol conversion module 112 of the master controller 110 identifies the instructions in the remote device communication. The protocol conversion module 112 encapsulates the identified instructions (e.g., turn off LED, modify intensity of LED, etc.) in the power line communication. Table 2 illustrates exemplary instructions and encapsulation of the instructions.

TABLE 2

| Exemplary Encapsulation | | | |
|---|---|---|---|
| RDM Communication Instruction | RDM Communication | Power Line Communication Instruction | Power Line Communication |
| Turn Lights to 50% Intensity | RDM Header; RDM Instruction | Turn Lights to 50% Intensity | PLC Header; RDM Instruction |
| Change the Color Temperature of the Lights | RDM Headers; RDM Instruction | Change the Color Temperature of the Lights | PLC Header; RDM Instruction |
| Change the Position of the Lights | RDM Header; Other RDM Data; RDM Instruction | Change the Position of the Lights | PLC Header; RDM Instruction |
| Turn Every other Light Off | RDM Header; RDM Instruction; Other RDM Data | Turn Every other Light Off | PLC Header; RDM Instruction |

In some examples, the protocol conversion module 112 of the master controller 110 identifies the instructions in the power line communication (e.g., change position of light, turn every other LED off, etc.). The protocol conversion module 112 identifies a remote device management code for a valid remote device management communication. The protocol conversion module 112 generates the remote device management communication based on the identified instructions and the identified remote device management code. Table 3 illustrates exemplary RDM codes.

TABLE 3

| Exemplary RDM Codes | | | |
|---|---|---|---|
| RDM Communication Instruction | RDM Communication | Power Line Communication Instruction | Power Line Communication |
| Turn Lights to 50% Intensity | RDM Header; RDM Instruction | Turn Lights to 50% Intensity | PLC Header; RDM Code AB |
| Change the Color Temperature of the Lights | RDM Headers; RDM Instruction | Change the Color Temperature of the Lights | PLC Header; RDM Code BC |
| Change the Position of the Lights | RDM Header; Other RDM Data; RDM Instruction | Change the Position of the Lights | PLC Header; RDM Code DL |
| Turn Every other Light Off | RDM Header; RDM Instruction; Other RDM Data | Turn Every other Light Off | PLC Header; RDM Code LD |

Although FIG. 1 illustrates the operator 105 utilizing the master controller 110 to control the lights, the master controller 110 can control the lights based on any type of automated control techniques. For example, the master controller 110 can include a light sensor and can control the lights based on the light detected by the light sensor. As another example, the master controller 110 can include a time schedule program and can control the lights based on the time schedule program (e.g., turn the lights on at a certain time, turn the lights to 50% intensity based on pre-determined conditions, etc.).

Figure 2A:
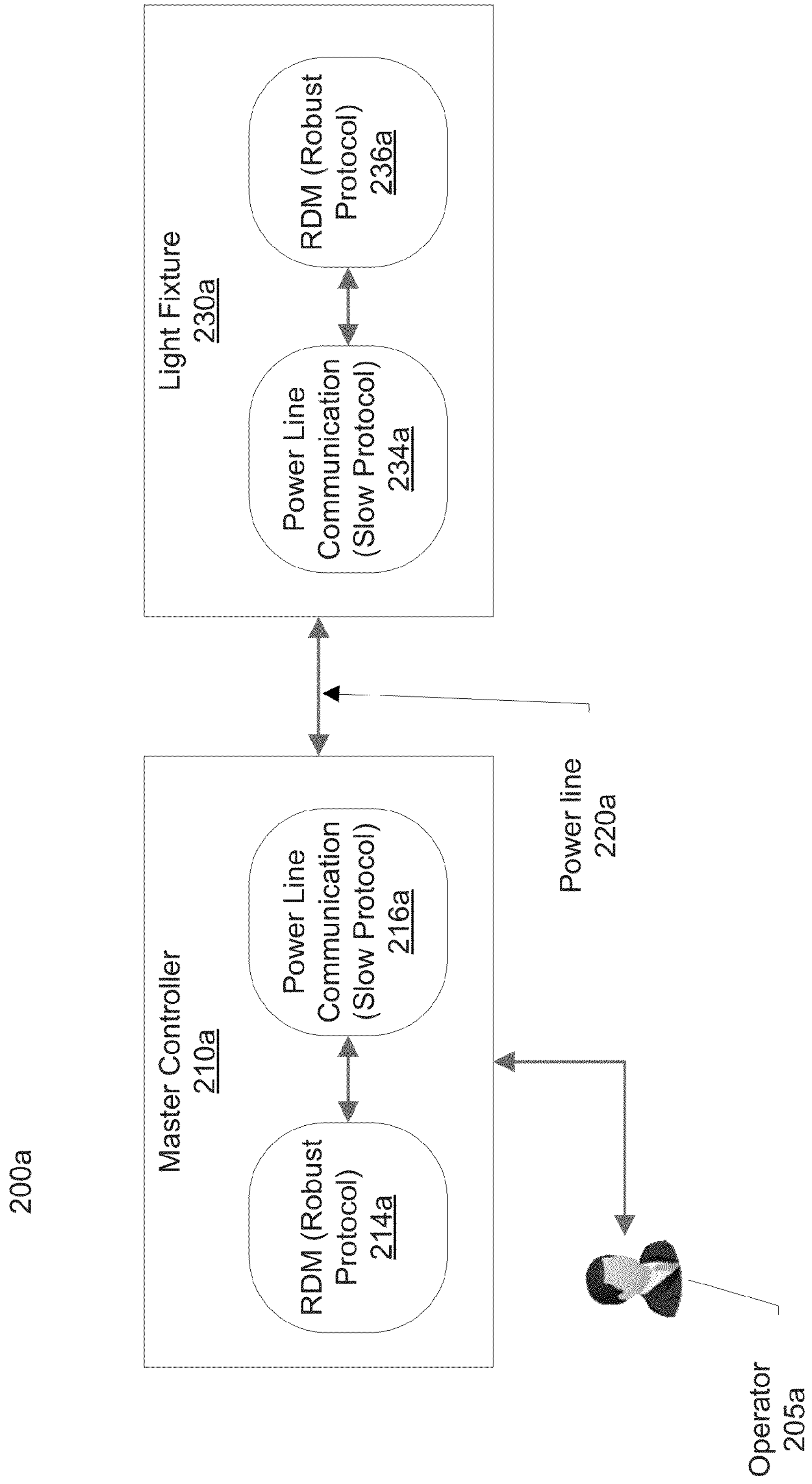
FIGS. 2A-2C are block diagrams of exemplary lighting environments.

FIG. 2A is a block diagram of another exemplary lighting environment 200*a*. The environment 200*a* includes a master controller 210*a* and a light fixture 230*a*. An operator 205*a* can modify a setting (e.g., intensity, color temperature, aperture, etc.) for the light fixture 230*a* using the master controller 210*a*. The master controller 210*a* generates the RDM communication 214*a* (e.g., generated based on the operator's modification of a setting) to control the light fixture 230*a* from the operator 205*a* (e.g., moving a switch, change a setting on a graphical user interface, etc.). The master controller 210*a* converts the RDM communication 214*a* to a power line communication 216*a*. The master controller 210*a* transmits the power line communication 216*a* to the light fixture 230*a* via a power line 220*a*. The light fixture 230*a* receives the power line communication 234*a* and converts the power line communication 234*a* to a RDM communication 236*a*. The light fixture 230*a* can control one or more associated lights based on the RDM communication 236*a*.

In this example, the RDM communication 214*a* and 236*a* are a robust protocol (e.g., high bandwidth, high bandwidth quality control, etc.) and the power line communication 216*a* and 234*a* is a slow protocol (e.g., 570 kilobits per second, 200 kilobits per second, etc.). In other words, the master controller 210*a* converts an inherently robust protocol with particular types of quality control characteristics (e.g., error control, transmission control, active acknowledgment of receipt, etc.) to an inherently slow protocol with limited quality control characteristics (e.g., multiple re-sends to avoid lost packets, passive acknowledge of receipt, etc.). The technology can advantageously handle both types of quality control characteristics (i.e., the quality control characteristics of the RDM communication and the quality control characteristics of the power line communication), thereby reducing communication losses associated with RDM communication (e.g., packet collisions, redundant instructions, etc.) and power line communication (e.g., electrical interference, magnetic interference, etc.). The master controller 210*a* can remove the quality control characteristics and/or insert other types of quality control characteristics to the power line communication. The conversion between a robust protocol and a slow protocol advantageously enables the technology to utilize existing technology (e.g., power lines, light systems, etc.) with high fidelity control techniques (e.g., individual control of LEDs, control features, etc.).

In some examples, the communication size can be minimized for the power line communication 216*a* and 234*a* to reduce the transmission time via the power line 220*a*. Table 4 illustrates exemplary communication size of the communication. Although FIG. 2A and Table 4 illustrate the power line communication 216*a* and 234*a* as two parts of the diagram, the power line communication 216*a* and 234*a* can be the same communication transmitted via the power line 220*a*. In some examples, the power line communication 216*a* and 234*a* are different due external causes (e.g., transmission interference, repeater addition, etc.).

TABLE 4

| Exemplary Communication Size | | | |
|---|---|---|---|
| RDM Communication 214a | Power Line Communication 216a | Power Line Communication 234a | RDM Communication 236a |
| 4 packets | 1 packet | 1 packet | 3 packets |
| 24 bytes | 4 bytes | 4 bytes | 24 bytes |
| 24 bytes | 4 bytes | 4 bytes | 20 bytes |
| 300 packets | 2 bytes | 2 bytes | 1 packet |

Figure 2B:
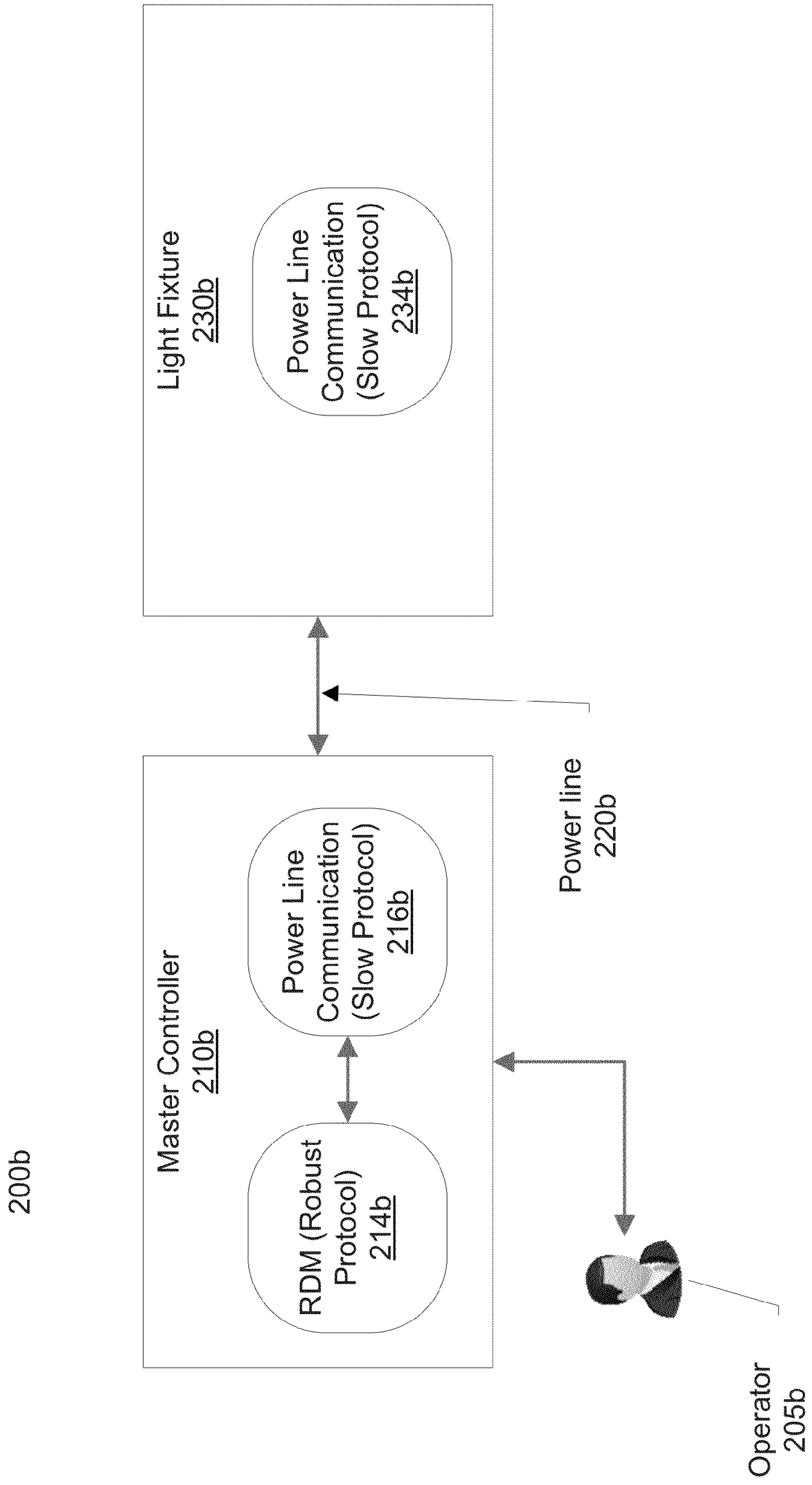

FIG. 2B is a block diagram of another exemplary lighting environment 200*b*. The environment 200*b* includes a master controller 210*b* and a light fixture 230*b*. An operator 205*b* can modify a setting (e.g., intensity, color temperature, aperture, etc.) for the light fixture 230*b* using the master controller 210*b*. The master controller 210*b* generates the RDM communication 214*b* (e.g., generated based on the operator's modification of a setting) to control the light fixture 230*b* from the operator 205*b* (e.g., moving a switch, change a setting on a graphical user interface, etc.). The master controller 210*b* converts the RDM communication 214*b* to a power line communication 216*b*. The master controller 210*b* transmits the power line communication 216*b* to the light fixture 230*b* via the power line 220*b*. The light fixture 230*a* receives the power line communication 234*b* and controls one or more associated lights based on the power line communication 236*b*.

In some examples, the communication size can be minimized for the power line communication 216*b* and 234*b* to reduce the transmission time via the power line 220*b*. Table 5 illustrates exemplary communication size of the communication. Although FIG. 2B and Table 5 illustrate the power line communication 216*b* and 234*b* as two parts of the diagram, the power line communication 216*b* and 234*b* can be the same communication transmitted via the power line 220*b*. In some examples, the power line communication 216*b* and 234*b* are different due external causes (e.g., transmission interference, repeater addition, etc.).

TABLE 5

| Exemplary Communication Size | | |
|---|---|---|
| RDM Communication 214b | Power Line Communication 216b | Power Line Communication 234b |
| 6 packets | 1 packet | 1 packet |
| 20 bytes | 4 bytes | 4 bytes |
| 16 bytes | 4 bytes | 4 bytes |
| 100 packets | 2 bytes | 2 bytes |

Figure 2C:
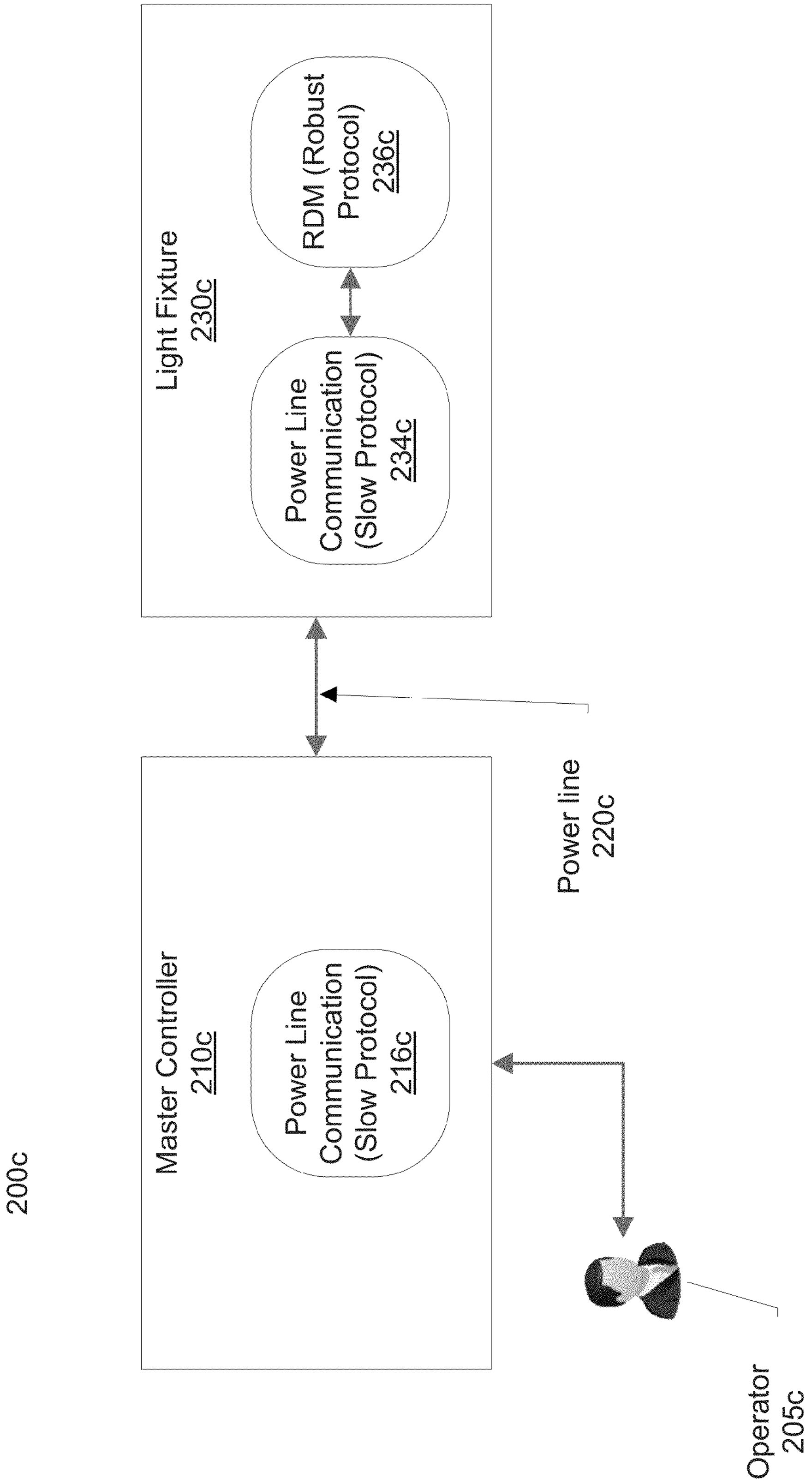

FIG. 2C is a block diagram of another exemplary lighting environment 200*c*. The environment 200*c* includes a master controller 210*c* and a light fixture 230*c*. An operator 205*c* can modify a setting (e.g., intensity, color temperature, aperture, etc.) for the light fixture 230*c* using the master controller 210*c*. The master controller 210*c* generates the power line communication 216*c* (e.g., generated based on the operator's modification of a setting) to control the light fixture 230*c* from the operator 205*c* (e.g., moving a switch, change a setting on a graphical user interface, etc.). The master controller 210*c* transmits the power line communication 216*c* to the light fixture 230*c* via the power line 220*c*. The light fixture 230*c* receives the power line communication 234*c* and converts the power line communication 234*c* to a RDM communication 236*c*. The light fixture 230*c* can control one or more associated lights based on the RDM communication 236*c*.

In some examples, the communication size can be minimized for the power line communication 216*c* and 234*c* to reduce the transmission time via the power line 220*c*. Table 6 illustrates exemplary communication size of the communication. Although FIG. 2C and Table 6 illustrate the power line communication 216*c* and 234*c* as two parts of the diagram, the power line communication 216*c* and 234*c* can be the same communication transmitted via the power line 220*c*. In some examples, the power line communication 216*c* and 234*c* are different due external causes (e.g., transmission interference, repeater addition, etc.).

TABLE 6

| Exemplary Communication Size | | |
|---|---|---|
| Power Line Communication 216c | Power Line Communication 234c | RDM Communication 236c |
| 1 packet | 1 packet | 3 packets |
| 4 bytes | 4 bytes | 24 bytes |
| 4 bytes | 4 bytes | 20 bytes |
| 2 bytes | 2 bytes | 1 packet |

Figure 3:
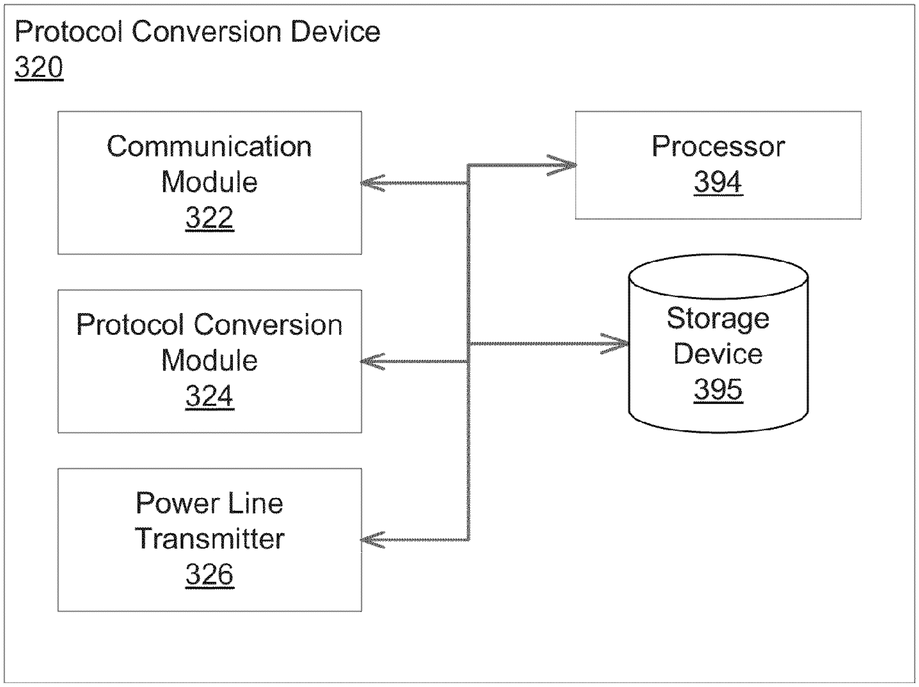
FIG. 3. is a block diagram of an exemplary protocol conversion device.

FIG. 3. is a block diagram of an exemplary protocol conversion device 320. The protocol conversion device 320 can be utilized and/or embedded into a master controller and/or a light fixture. The protocol conversion device 320 includes a communication module 322, a protocol conversion module 324, a power line transmitter 326, a processor 394, and a storage device 395. The modules and devices described herein can, for example, utilize the processor 394 to execute computer executable instructions and/or the modules and devices described herein can, for example, include their own processor to execute computer executable instructions (e.g., a protocol processing unit, a field programmable gate array processing unit). It should be understood the protocol conversion device 320 can include, for example, other modules, devices, and/or processors known in the art and/or varieties of the illustrated modules, devices, and/or processors.

The communication module 322 receives a remote device management (RDM) communication. The RDM communication includes one or more instructions to control one or more light fixtures (e.g., turn off individual LEDs, change intensity of light fixture, etc.), status monitoring information (e.g., LEDs operating at 50% output, temperature of light fixture components, etc.), and/or energy management information (e.g., ambient light at 25% and LEDs output at 75%, energy usage of light fixture, etc.).

The protocol conversion module 324 converts the remote device management communication to a power line communication. In some examples, the protocol conversion module 324 removes one or more unutilized RDM codes (e.g., RDM start code, RDM quality control code, etc.) from the remote device management communication before conversion to the power line communication. In other words, the protocol conversion module 324 removes any RDM codes that are not needed for the PLC and/or re-generation of the RDM communication at the other side of the PLC.

In other examples, the protocol conversion module 324 identifies redundant RDM codes in the remote device management communication (e.g., turn on commands to a plurality of light fixtures, intensity modification to a plurality of LEDs, etc.); consolidates the identified redundant RDM codes into a single RDM code (e.g., multicast PLC with single command, multicast PLC with multiple commands, etc.); and replaces the identified redundant RDM codes with the single RDM code in the remote device management communication before conversion to the power line communication.

In some examples, the protocol conversion module 324 identifies the one or more instructions to control the one or more light fixtures, the status monitoring information, and/or the energy management information in the RDM communication; identifies one or more recipients of the RDM communication; and generates the power line communication based on the identified one or more recipients and the identified one or more instructions to control the one or more light fixtures, the identified status monitoring information, and/or the identified energy management information. In other words, the protocol conversion module 324 identifies duplicative information to reduce the PLC size, thereby increasing the efficiency of the power line communication between the master controller and light fixtures.

The power line transmitter 326 transmits the power line communication via the power line. The processor 394 executes the operating system and/or any other computer executable instructions for the protocol conversion device 320 (e.g., executes applications). The storage device 395 stores light information and/or control information (e.g., light fixture serial number, light fixture address, light fixture usage, etc.). The storage device 395 can include a plurality of storage devices and/or the protocol conversion device 320 can include a plurality of storage devices (e.g., a protocol storage device, an instruction storage device). The storage device 395 can include, for example, long-term storage (e.g., a hard drive, a tape storage device, flash memory), short-term storage (e.g., a random access memory, a graphics memory), and/or any other type of computer readable storage.

Figure 4:
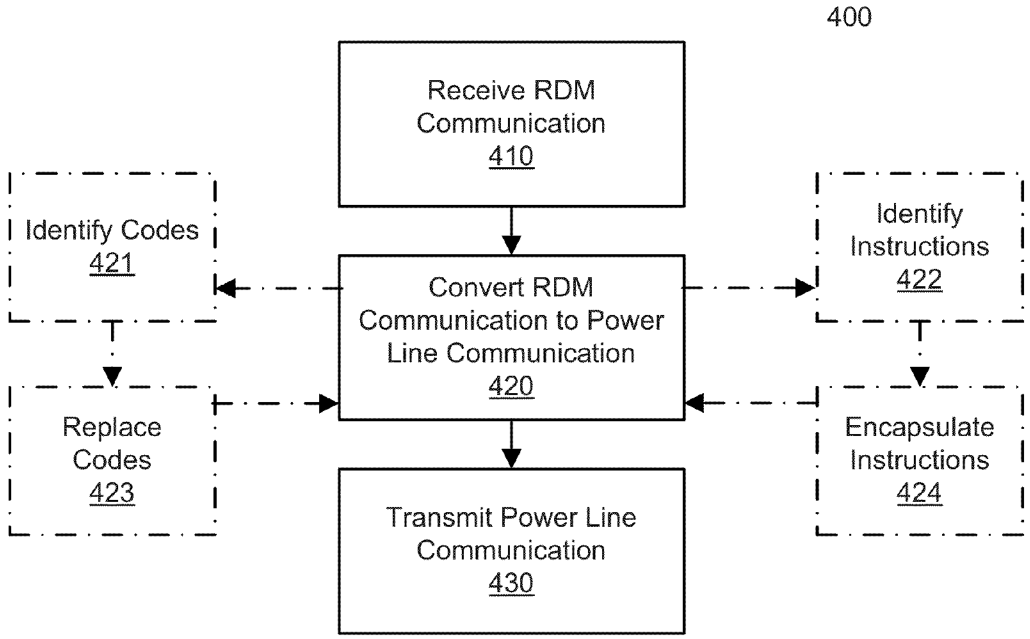
FIG. 4 is a process diagram of an exemplary power line light controller method.

FIG. 4 is a process diagram of an exemplary protocol conversion method 400 utilizing, for example, the protocol conversion device 320 of FIG. 3. The communication module 322 receives (410) a remote device management (RDM) communication. The RDM communication includes one or more instructions associated with one or more light fixtures. The protocol conversion module 324 converts (420) the remote device management communication to a power line communication. The power line transmitter 326 transmits (430) the power line communication to the one or more light fixtures via the power line.

In some examples, the communication module 322 receives (410) the RDM communication from a controller operated by a user (e.g., controller electrically connected to the protocol conversion device 320, controller embedded into the protocol conversion device 320, etc.) and the one or more instructions control the one or more light fixtures. In other examples, the communication module 322 receives (410) the RDM communication from the one or more light fixtures and the one or more instructions include light information for the one or more light fixtures.

In some examples, the protocol conversion module 324 identifies (422) the one or more instructions to control the one or more light fixtures in the RDM communication. The protocol conversion module 324 encapsulates (424) the one or more instructions in the power line communication. The one or more instructions are a smaller byte size than the RDM communication (e.g., RDM communication is ten bytes and the instructions are one byte, RDM communication is twenty bytes and the instructions are two bytes, etc.), which advantageously decreases the size of the power line communication and decreases the time to transmit the power line communication via the power line.

In other examples, the protocol conversion module 324 identifies (421) one or more RDM codes in the RDM communication based on a RDM code index (e.g., turn on LEDs is code=ON; turn off LEDs is code=OFF; etc.). The protocol conversion module 324 replaces (423) the identified one or more RDM codes with a RDM code index identifier in the RDM communication (e.g., turn on command is replaced with ON; turn off command for all LEDs is replaced with OFF ALL; etc.).

In some examples, the RDM code index includes a plurality of RDM codes with corresponding RDM code index identifiers and the RDM code index identifier is a smaller byte size than the corresponding RDM code. Table 7 illustrates an exemplary code index and corresponding byte size. The RDM codes reduce the size of the power line communication, which advantageously enables the same instructions to be efficiently and effectively communicated between controllers and/or light fixtures via power line communication.

TABLE 7

| Exemplary Code Index | | | |
|---|---|---|---|
| RDM Code | RDM Code Byte Size | RDM Code Index Identifier | RDM Code Identifier Size |
| Turn Lights to 50% Intensity | 15 Bytes | AB | 1 Byte |
| Change the Color Temperature of the Lights | 25 Bytes | CO | 1 Byte |
| Change the Position of the Lights | 34 Bytes | PO | 2 Bytes |
| Turn Every other Light Off | 45 Bytes | OFF-Other | 3 Bytes |

In other examples, the RDM code index includes a plurality of pre-determined RDM codes and each of the plurality of pre-determined RDM codes has a corresponding RDM code index identifier. Table 8 illustrates an exemplary code index. In some examples, the RDM code index identifier includes RDM Codes and individualized information for the RDM Codes (e.g., Move Lights A-G 5 degrees Left to ML-#A-G;

5L, Turn Off Lights 45A through 55Z to OFF-#45A-55Z, etc.). In other examples, each type of light fixture includes a code index generated for the RDM codes that will be sent to the respective light fixture (e.g., every possible RDM code, the top ten RDM codes, the top 90% of the RDM codes, etc.). In some examples, a master code index is utilized for the controllers and/or light fixtures in an environment (e.g., a building, a campus, etc.). The master code index can include the permutations of the RDM codes utilized in the particular environment, a standard set of RDM codes for a typical environment, and/or a individualized RDM codes for particular setups (e.g., specialized light fixtures on a side of a building, light fixtures with specialized color combinations, etc.).

TABLE 8

Exemplary Code Index

| RDM Code | RDM Code Index Identifier |
|---|---|
| Turn Lights to 50% Intensity | AB |
| Change the Color Temperature of the Lights | CO |
| Change the Position of the Lights | PO |
| Turn Every other Light Off | OFF-Other |
| Move Lights A-G 5 degrees Left | ML-#A-G; 5L |

In other examples, the RDM code index identifier includes RDM Codes and filler blocks for the individualized information for the RDM Codes. In these examples, the protocol conversion module 324 inputs the individualized information for the RDM Code. Table 9 illustrates an exemplary code index with the filler blocks and the individualized information.

TABLE 9

Exemplary Code Index

| RDM Code | RDM Code Index Identifier (Filler Block in [ ]) | Individualized Information | RDM Code Identifier |
|---|---|---|---|
| Turn Lights to 75% Intensity | BC | Not applicable | BC |
| Change the Color Temperature of the Lights to Maximum | COM | Not applicable | COM |
| Change the Position of the Lights to Default | POD | Not applicable | POD |
| Turn Every other Light Off | OFF-[Lights] | Lights = Other | OFF-Other |
| Move Lights A-G 5 degrees Left | ML-[Lights]; [Movement] | Lights = A-G; Movement = 5L | ML-A-G; 5L |

Figure 5:
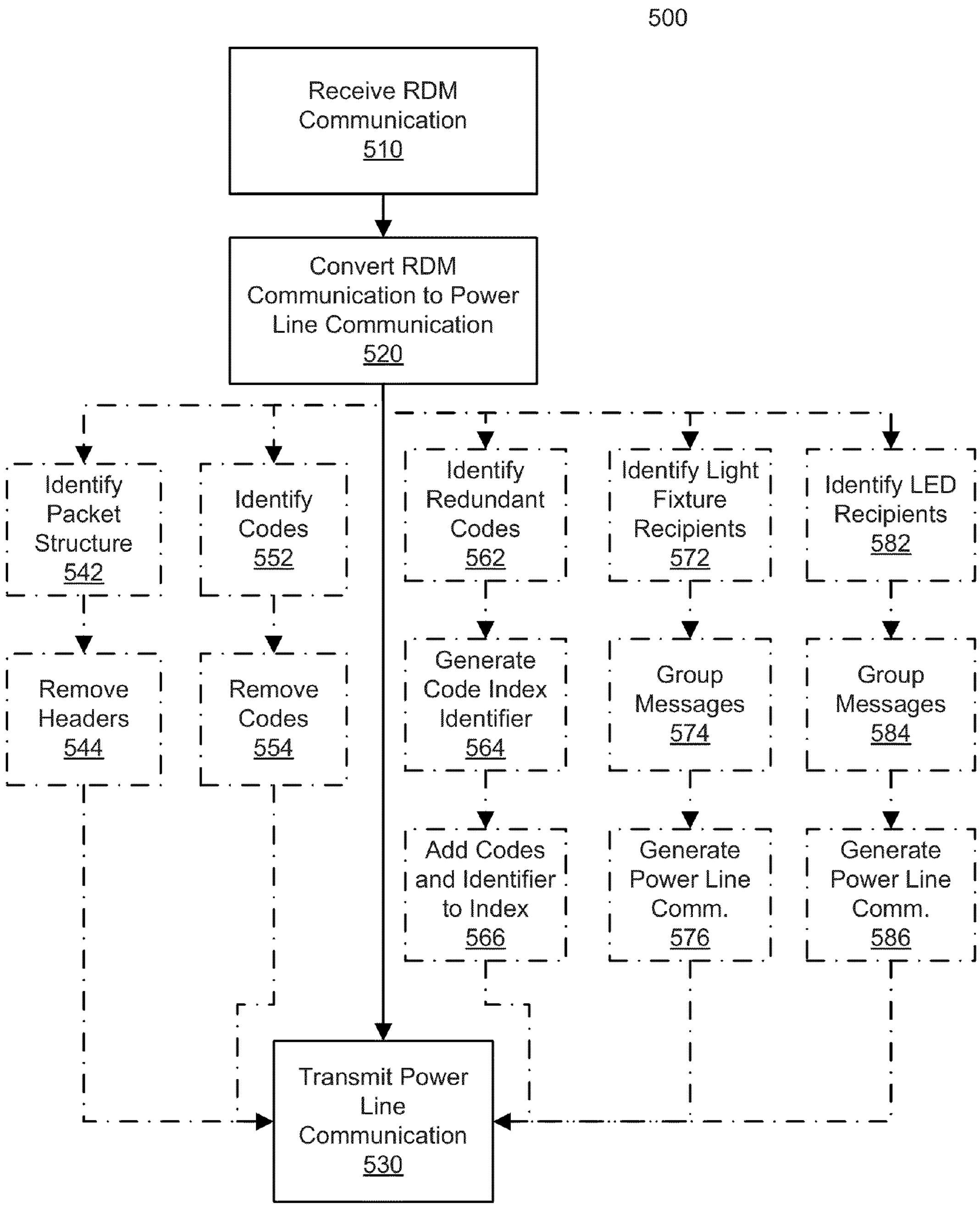
FIG. 5 is a flowchart of another exemplary power line light controller method.

FIG. 5 is a process diagram of an exemplary protocol conversion method 500 utilizing, for example, the protocol conversion device 320 of FIG. 3. The communication module 322 receives (510) a remote device management (RDM) communication. The RDM communication includes one or more instructions associated with one or more light fixtures. The protocol conversion module 324 converts (520) the remote device management communication to a power line communication. The power line transmitter 326 transmits (530) the power line communication to the one or more light fixtures via the power line.

In some examples, the protocol conversion module 324 identifies (542) a RDM packet structure in the RDM communication. The protocol conversion module 324 removes (544) one or more headers in the RDM packet structure from the RDM communication (e.g., RDM start code, RDM from code, etc.). Table 10 illustrates exemplary removal of headers.

TABLE 10

Exemplary Removal

| Initial RDM Communication | Processed RDM Communication |
|---|---|
| RDM Start Code; RDM Header RDM Instruction | RDM Header; RDM Instruction |
| RDM Headers; RDM Instruction; RDM End Code | RDM Headers; RDM Instruction |
| RDM Version Code; Other RDM Data; RDM Instruction | RDM Instruction |

In other examples, the protocol conversion module 324 identifies (552) one or more unutilized RDM codes in the RDM communication based on a RDM type of the RDM communication (e.g., RDM quality control code, RDM multicast code, etc.). The protocol conversion module 324 removes (554) the identified one or more unutilized RDM codes from the RDM communication.

In some examples, the protocol conversion module 324 identifies (562) at least one redundant RDM code in the RDM communication. The protocol conversion module 324 generates (564) a RDM code index identifier for the identified at least one redundant RDM code in the RDM communication. The protocol conversion module 324 adds (566) the RDM code index identifier and the identified at least one redundant RDM code to the RDM code index (e.g., add Turn On every third LED to code index as ON-Third; add change intensity of all outside LEDs to code index as INTENSITY-OUTSIDE; etc.). In other examples, the protocol conversion module 324 adds all of the identified redundant RDM codes into the RDM code index. In some examples, the protocol conversion module 324 adds the most used RDM codes into the RDM code index (e.g., top ten RDM codes, top 90% of the RDM codes, etc.).

In other examples, the RDM communication includes a plurality of RDM messages. The protocol conversion module 324 identifies (572) one or more light fixture recipients of the plurality of RDM messages. The protocol conversion module 324 groups (574) the plurality of RDM messages into one or more sub-sets of RDM messages based on the identification of the one or more light fixture recipients of the plurality of RDM messages. The protocol conversion module 324 generates (576) the power line communication based on the one or more sub-sets of RDM messages. Table 11 illustrates exemplary recipient grouping.

TABLE 11

Exemplary Recipient Grouping

| RDM Communication Instruction | RDM Communication Recipient | Power Line Communication Instruction | Power Line Communication Recipients |
|---|---|---|---|
| Turn Lights to 50% Intensity | Light Fixture A | Turn Lights to 50% Intensity | Light Fixtures A and B |

TABLE 11-continued

Exemplary Recipient Grouping

| RDM Communication Instruction | RDM Communication Recipient | Power Line Communication Instruction | Power Line Communication Recipients |
|---|---|---|---|
| Turn Lights to 50% Intensity | Light Fixture B | | |
| Change the Position of the Lights | Light Fixture D | Change the Position of the Lights | Light Fixtures D and E |
| Change the Position of the Lights | Light Fixture E | | |

In some examples, any of the processes described herein (542, 544, 552, 554, 562, 564, 566, 572, 574, 576, 582, 584, and/or 586) to reduce a size of the power line communication can be utilized to increase the efficiency of the technology (e.g., the recipient grouping and the RDM codes are utilized for a set of instructions, the RDM codes and the RDM the unutilized code removal are utilized for a set of instructions, etc.). The processes can be processed sequentially and/or in parallel. Table 12 illustrates exemplary recipient grouping and a code replacement.

TABLE 12

Exemplary Recipient Grouping and Code Replacement

| RDM Communication Instruction | RDM Code | RDM Communication Recipient | Power Line Communication Instruction | Power Line Communication Recipients |
|---|---|---|---|---|
| Turn Lights to 30% Intensity | I30 | Light Fixture A | I30 | Light Fixtures A and B |
| Turn Lights to 30% Intensity | I30 | Light Fixture B | | |
| Turn Lights 30 degrees to the Left | P-30L | Light Fixture D | P-30L | Light Fixtures D and E |
| Turn Lights 30 degrees to the Left | P-30L | Light Fixture E | | |

In some examples, the RDM communication includes a plurality of RDM messages and each light fixture of the one or more light fixtures includes one or more light emitting diodes (LEDS). The protocol conversion module 324 identifies (582) one or more LEDS recipients of the plurality of RDM messages. The protocol conversion module 324 groups (584) the plurality of RDM messages into one or more sub-sets of RDM messages based on the identification of the one or more LEDS recipients of the plurality of RDM messages. The protocol conversion module 324 generates (586) the power line communication based on the one or more sub-sets of RDM messages.

In other examples, each of the one or more light fixtures includes a plurality of light emitting diodes (LEDs).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A light controller system, comprising:

one or more light fixtures, each light fixture of the one or more light fixture electrically coupled via a power line, each light fixture of the one or more light fixtures comprising:

a protocol conversion module configured to convert instructions between power line communication and remote device management communication of the RDM protocol, called RDM communication, a communication module configured to communicate the power line communication over the power line, and a light controller configured to control one or more light emitting diodes (LEDS) in the respective light fixture based on the instructions; a master controller comprising:

a protocol conversion module configured to convert the instructions between the power line communication and the RDM communication, the protocol conversion module of the master controller is further configured to:

identify the instructions in the RDM communication; and encapsulate the identified instructions in the power line communication, the identified instructions are a smaller byte size than the RDM communication; and a communication module configured to communicate the power line communication over the power line.

2. The light controller system of claim 1, wherein each light fixture of the one or more light fixtures further comprising a light response module configured to generate the instructions based on the control of the one or more LEDS, the instructions comprise a light temperature, a light setting, or any combination thereof.

3. The light controller system of claim 1, wherein the protocol conversion module for each light fixture of the one or more light fixtures is further configured to.

identify the instructions in the power line communication;

identify a remote device management code for a valid remote device management communication; and generate the remote device management communication based on the identified instructions and the identified remote device management code.

4. A light controller method, comprising:

receiving a remote device management communication of the RDM protocol called RDM communication, the RDM communication comprises one or more instructions associated with one or more light fixtures;

configuring a light controller to control one or more light emitting diodes (LEDS) in the respective light fixture based on the instructions; converting the RDM communication to a power line communication, comprising:

identifying the one or more instructions to control the one or more light fixtures in the RDM communication; and encapsulating the one or more instructions in the power line communication, the one or more instructions are a smaller byte size than the RDM communication; and transmitting the power line communication to the one or more light fixtures via the power line.

5. The light controller method of claim 4, wherein the RDM communication is received from a controller operated by a user and the one or more instructions control the one or more light fixtures.

6. The light controller method of claim 4, wherein the RDM communication is received from the one or more light fixtures and the one or more instructions comprise light information for the one or more light fixtures.

7. The light controller method of claim 4, further comprising:

identifying one or more RDM codes in the RDM communication based on a RDM code index; and replacing the identified one or more RDM codes with a RDM code index identifier in the RDM communication.

8. The light controller method of claim 7, wherein the RDM code index comprises a plurality of RDM codes with corresponding RDM code index identifiers and the RDM code index identifier is a smaller byte size than the corresponding RDM code.

9. The light controller method of claim 7, wherein the RDM code index comprises a plurality of pre-determined RDM codes and each of the plurality of pre-determined RDM codes has a corresponding RDM code index identifier.

10. The light controller method of claim 7, further comprising:

identifying at least one redundant RDM code in the RDM communication;

generating a RDM code index identifier for the identified at least one redundant RDM code in the RDM communication; and adding the RDM code index identifier and the identified at least one redundant RDM code to the RDM code index.

11. The light controller method of claim 4, further comprising:

identifying one or more unutilized RDM codes in the RDM communication based on a RDM type of the RDM communication; and removing the identified one or more unutilized RDM codes from the RDM communication.

12. The light controller method of claim 4, further comprising:

identifying a RDM packet structure in the RDM communication; and removing one or more headers in the RDM packet structure from the RDM communication.

13. The light controller method of claim 4, wherein the RDM communication comprises a plurality of RDM messages and the method further comprising:

identifying one or more light fixture recipients of the plurality of RDM messages;

grouping the plurality of RDM messages into one or more sub-sets of RDM messages based on the identification of the one or more light fixture recipients of the plurality of RDM messages; and generating the power line communication based on the one or more sub-sets of RDM messages.

14. The light controller method of claim 4, wherein the RDM communication comprises a plurality of RDM messages, each light fixture of the one or more light fixtures comprises one or more light emitting diodes (LEDS), and the method further comprising:

identifying one or more LEDS recipients of the plurality of RDM messages;

grouping the plurality of RDM messages into one or more sub-sets of RDM messages based on the identification of the one or more LEDS recipients of the plurality of RDM messages; and generating the power line communication based on the one or more sub-sets of RDM messages.

15. The light controller method of claim 4, wherein each of the one or more light fixtures comprises a plurality of light emitting diodes (LEDs).

16. A protocol conversion device, comprising:

a communication module configured to receive a remote device management communication of the RDM protocol, called RDM communication, the RDM communication comprises one or more instructions to control one or more light fixtures, status monitoring information, energy management information, or any combination thereof;

a light controller configured to control one or more light emitting diodes (LEDS) in the respective light fixture based on the instructions;

a protocol conversion module configured to convert the RDM communication to a power line communication, comprising:

identifying the one or more instructions to control the one or more light fixtures in the RDM communication; and encapsulating the one or more instructions in the power line communication, the one or more instructions are a smaller byte size than the RDM communication;

a power line transmitter configured to transmit the power line communication via the power line.

17. The protocol conversion device of claim 16, wherein the protocol conversion module is further configured to remove one or more unutilized RDM codes from the remote device management communication before conversion to the power line communication.

18. The protocol conversion device of claim 16, wherein the protocol conversion module is further configured to:

identify redundant RDM codes in the remote device management communication;

consolidate the identified redundant RDM codes into a single RDM code; and replace the identified redundant RDM codes with the single RDM code in the remote device management communication before conversion to the power line communication.

19. The protocol conversion device of claim 16, wherein the protocol conversion module is further configured to:

identify the one or more instructions to control the one or more light fixtures, the status monitoring information, the energy management information, or any combination thereof in the RDM communication;

identify one or more recipients of the RDM communication; and generate the power line communication based on the identified one or more recipients and the identified one or more instructions to control the one or more light fixtures, the identified status monitoring information, the identified energy management information, or any combination thereof.

* * * * *

UNITED STATES PATENT AND TRADEMARK OFFICE

CERTIFICATE OF CORRECTION

PATENT NO. : 8,768,493 B2
APPLICATION NO. : 13/455544
DATED : July 1, 2014
INVENTOR(S) : Francois-Xavier Souvay and Gregory Campbell It is certified that error appears in the above-identified patent and that said Letters Patent is hereby corrected as shown below:

On the Title Page, item (56), should read;

Referenced Cited:

2007/121573 A1 11/2007 Jungwirth, et al.

In the Claims

Claim 3, Column 16, line 45, "more light fixtures is further configured to." should read -- more light fixtures is further configured to: --.

Signed and Sealed this
Eleventh Day of November, 2014

Michelle K. Lee

Michelle K. Lee
*Deputy Director of the United States Patent and Trademark Office*